(12) United States Patent
Kipke et al.

(10) Patent No.: US 10,183,476 B2
(45) Date of Patent: Jan. 22, 2019

(54) MULTILAYER ADHESIVE BONDING ELEMENT

(71) Applicant: TESA SE, Norderstedt (DE)

(72) Inventors: Jennifer Kipke, Hamburg (DE);
Christoph Nagel, Hamburg (DE);
Jannik Sellin, Hamburg (DE)

(73) Assignee: TESA SE, Norderstedt (DE)

( * ) Notice: Subject to any disclaimer, the term of this patent is extended or adjusted under 35 U.S.C. 154(b) by 0 days.

(21) Appl. No.: 15/783,531

(22) Filed: Oct. 13, 2017

(65) Prior Publication Data

US 2018/0111363 A1 Apr. 26, 2018

(30) Foreign Application Priority Data

Oct. 21, 2016 (DE) .......................... 10 2016 220 691

(51) Int. Cl.
*B32B 43/00* (2006.01)
*B29C 53/80* (2006.01)
(Continued)

(52) U.S. Cl.
CPC ........ *B32B 43/006* (2013.01); *B29C 53/8083* (2013.01); *B29C 65/76* (2013.01);
(Continued)

(58) Field of Classification Search
USPC ............ 156/247, 249, 289, 379.6, 510, 537; 428/343, 352, 354
See application file for complete search history.

(56) References Cited

U.S. PATENT DOCUMENTS 3,503,782 A * 3/1970 Ayres .................. D21H 19/82
19/82
3,850,786 A * 11/1974 Jeffries .................. C09J 7/21
428/352
(Continued)

FOREIGN PATENT DOCUMENTS

DE 198 07 752 A1 8/1999
DE 100 11 788 A1 3/2002
(Continued)

OTHER PUBLICATIONS

German Office Action dated Jul. 4, 2017 corresponding to Application No. 10 2016 220 691.5.

*Primary Examiner* — Sing P Chan
(74) *Attorney, Agent, or Firm* — Norris McLaughlin, P.A.

(57) ABSTRACT

Method for bonding by wrapping a medium which expands transversely to a winding with an adhesive tape, in which:
an adhesive tape is unrolled from an adhesive tape roll,
the unrolled adhesive tape is provided on one side of a carrier film (1)
with an adhesive cement layer (2) and on an opposite side partially with a separating agent layer (3),
wherein the area covered by the separating agent layer (3) takes up not more than 50% of the total area of the carrier reverse side,
wherein at least the surface of the side of the carrier film (1) which is furnished with a separating agent layer (3) is etched,
the adhesive tape is wound around the medium which expands transversely to a winding, so that at least a portion of the adhesive tape is bonded to a lower winding ply by the adhesive cement layer (2).

14 Claims, 3 Drawing Sheets

(51) Int. Cl.
*B29C 65/76* (2006.01)
*B32B 7/12* (2006.01)
*B32B 38/00* (2006.01)
*B32B 37/12* (2006.01)
*C09J 7/22* (2018.01)
*H02K 3/40* (2006.01)
*H02K 3/30* (2006.01)
*H01M 2/02* (2006.01)
*B32B 1/00* (2006.01)
*C09J 5/02* (2006.01)
*B29C 53/56* (2006.01)
*B65H 35/00* (2006.01)
*C08K 7/02* (2006.01)

(52) U.S. Cl.
CPC ............... *B32B 1/00* (2013.01); *B32B 7/12* (2013.01); *B32B 37/12* (2013.01); *B32B 38/0008* (2013.01); *B32B 43/003* (2013.01); *C09J 5/02* (2013.01); *C09J 7/22* (2018.01); *H01M 2/0267* (2013.01); *H02K 3/30* (2013.01); *H02K 3/40* (2013.01); *B29C 53/562* (2013.01); *B32B 2310/14* (2013.01); *B32B 2405/00* (2013.01); *B65H 35/0013* (2013.01); *B65H 2801/72* (2013.01); *C08K 7/02* (2013.01); *C09J 2201/122* (2013.01); *C09J 2201/606* (2013.01); *C09J 2203/302* (2013.01); *C09J 2205/102* (2013.01); *C09J 2205/106* (2013.01)

(56) References Cited

U.S. PATENT DOCUMENTS

| | | | | |
|---|---|---|---|---|
| 4,414,275 A * | 11/1983 | Woods | ............ | C09J 4/00 428/352 |
| 5,061,535 A * | 10/1991 | Kreckel | ............ | A61F 13/58 428/42.2 |
| 6,432,528 B1 * | 8/2002 | Faust | ............ | B65B 51/067 428/343 |
| 6,432,529 B1 | 8/2002 | Harder et al. | | |
| 6,541,707 B2 | 4/2003 | Külper et al. | | |
| 6,759,110 B1 * | 7/2004 | Fleming | ............ | C09J 7/403 428/41.8 |
| 8,394,478 B2 * | 3/2013 | Ukei | ............ | C09J 7/405 428/41.3 |
| 2002/0029855 A1 * | 3/2002 | Vasilakes | ............ | B65B 51/067 156/387 |
| 2002/0057300 A1 * | 5/2002 | Baker | ............ | B65B 51/067 347/2 |
| 2002/0125037 A1 | 9/2002 | Kulper et al. | | |
| 2004/0265492 A1 * | 12/2004 | Free | ............ | B41M 5/0047 427/256 |
| 2005/0013958 A1 * | 1/2005 | Callahan | ............ | C09J 7/20 428/40.1 |
| 2006/0127626 A1 * | 6/2006 | Fleming | ............ | B29C 59/022 428/40.1 |
| 2006/0128921 A1 * | 6/2006 | Cray | ............ | C09D 183/04 528/31 |
| 2006/0228480 A1 * | 10/2006 | Lin | ............ | C09J 7/403 427/275 |
| 2009/0120574 A1 | 5/2009 | Husemann et al. | | |
| 2009/0123667 A1 | 5/2009 | Husemann et al. | | |
| 2009/0211791 A1 * | 8/2009 | Tredwell | ............ | H05K 3/0052 174/254 |
| 2010/0047518 A1 | 2/2010 | Husemann et al. | | |
| 2011/0143134 A1 * | 6/2011 | Emslander | ............ | B32B 7/06 428/352 |
| 2012/0111830 A1 | 5/2012 | Husemann et al. | | |
| 2014/0014403 A1 * | 1/2014 | Miller | ............ | H05K 1/0281 174/260 |
| 2015/0044431 A1 * | 2/2015 | Landa | ............ | B41J 2/01 428/195.1 |
| 2015/0144259 A1 * | 5/2015 | Laulicht | ............ | B29C 65/5021 156/247 |
| 2017/0306184 A1 * | 10/2017 | Nakayama | ............ | C08F 230/08 |
| 2018/0111363 A1 * | 4/2018 | Hahnel | ............ | B32B 1/00 |
| 2018/0112107 A1 * | 4/2018 | Hahnel | ............ | C09J 5/00 |

FOREIGN PATENT DOCUMENTS

| | | |
|---|---|---|
| DE | 10 2004 058 279 A1 | 6/2006 |
| DE | 10 2004 058 281 A1 | 6/2006 |
| DE | 10 2004 058 282 A1 | 6/2006 |
| DE | 10 2008 037 223 A1 | 2/2010 |

* cited by examiner

MULTILAYER ADHESIVE BONDING ELEMENT

This application claims priority of German Patent Application No. 10 2016 220 691.5, filed on Oct. 21, 2016, the entire contents of which is incorporated herein by reference.

The invention relates to a method for bonding by wrapping a medium which expands transversely to a winding with an adhesive tape. The invention further relates to a device with an adhesive tape that is wound onto itself and an applicator for applying the adhesive tape.

BACKGROUND OF THE INVENTION

A range of applications for adhesive tapes are known in which the adhesive tapes are wound onto themselves multiple times around a medium. For example, when manufacturing high-voltage batteries adhesive tapes are wound around themselves and bonded together in several layers. A force is applied to the winding structure not only by the preloading created during the act of winding itself, but also by an expansion process during battery charging and discharging processes. In some applications, the adhesive tapes may be reinforced with filaments. The filaments preferably extend in the lengthwise direction of the adhesive tape and increase the tensile strength of the adhesive tape considerably. However, in multiple winding situations the adhesion of the superimposed windings presents difficulties beyond the tensile strength of the adhesive tape. Normally, the adhesive tapes are supplied in the form of an adhesive tape roll before their application. To this end, the reverse sides of the adhesive tapes, that is to say the sides that face the adhesive cement layer on a carrier film, are furnished outwardly with a separating layer. The separating layer reduces the separating force between the carrier film and the adhesive cement layer of the following adhesive tape winding, and this is what makes it possible to unwind the adhesive tape from the adhesive tape roll in the first place. This renders the use of a liner unnecessary and reduces costs. The separating layer may for example be a silicone-containing layer, or also a release coating. The separating layer usually remains on the outside of the carrier film after the adhesive tape is unrolled and of course also reduces the separating forces between one winding of the adhesive tape and the following outer winding of adhesive tape when the tape is subsequently wound round the medium, for example a high-voltage battery. Particularly with media which expand transversely to the winding, such as high-voltage batteries, this can cause the windings of the wound adhesive tape to become detached because of the expansion forces generated.

It is therefore the object of the present invention to provide a method for bonding by wrapping media that expand transversely which avoids the drawbacks described previously.

It is a further object of the present invention to provide a device that has an adhesive tape which bonds with itself and avoids the drawbacks described previously.

It is a further object of the invention to provide an applicator with which the method according to the invention may be carried out.

In a first aspect thereof, the object is solved with a method as described in the introduction having the features of Claim 1.

SUMMARY OF THE INVENTION

The adhesive tape for use in the method according to the invention includes a carrier film which preferably extends over the full length and width of an adhesive tape. An adhesive cement layer is preferably provided over the full expanse of one side of the carrier film, and no separating agent layer (and/or other layer) is provided on an opposite side of the carrier film, also referred to as the reverse side hereinbelow.

In one variant of the invention, the separating agent layer is partially present, the area covered by the separating agent layer taking up not more than 50%, preferably not more than 20%, more preferably not more than 10%, more preferably not more than 5%, of the total area of the carrier reverse side.

It is essential to the invention that at least the surface of the reverse side of the film, preferably both surfaces, is/are etched.

The adhesive tape is presented in the form of an adhesive tape roll and is unwound from the adhesive tape roll for application. The adhesive tape or a portion of the adhesive tape is unwound. The adhesive tape is then wound around the medium which expands transversely in such manner that at least a portion of the adhesive tape is bonded to the adhesive cement layer on a lower winding ply directly adjacent to it.

It is preferably also provided that the adhesive tape is wound around the medium which expands transversely to the winding in several winding plies which are bonded one on top of the other. According to the invention, the adhesive tape also adheres to itself, at least along a portion of a winding ply or along several winding plies.

DETAILED DESCRIPTION

Films such as PA, PU or PVC, polyolefins or polyester, preferably a polyester of PET (polyethylene terephthalate) are suitable for use as the carrier film. The film itself may in turn consist of a plurality of single plies, for example plies that have been co-extruded to create a film.

Besides polyolefins, copolymers of ethylene and polar monomers such as styrene, vinyl acetate, methyl methacrylate, butyl acrylate or acrylic acid are suitable. It may be a homopolymer such as HDPE, LDPE, MDPE or a copolymer of ethylene or another olefin such as propene, butene, hexene or octene (LLDPE, VLLDE, for example). Polypropylenes (for example polypropylene homopolymers, polypropylene random copolymers or polypropylene block copolymers) are also suitable.

Particularly preferred are polyester-based films, particularly those made from polyethylene terephthalate.

Monoaxially and biaxially stretched films lend themselves extremely well to use as films according to the invention. Monoaxially stretched polypropylene for example is characterized by very good tear strength and low longitudinal expansion.

In order to achieve very good results for the roughening, it is advisable for the reagent used for etching the film to be trychloroacetic acid ($Cl_3$—COOH), or trychloroacetic acid in combination with inert crystalline compounds, preferably silicon compounds, more preferably $[SiO_2]_x$.

The purpose of the inert crystalline compounds is to be incorporated into the surface of the PET film in order thereby to reinforce the roughness and the surface energy.

The thickness of the film according to one preferred embodiment is between 5 and 250 μm, preferably between 6 and 120 μm, more particularly between 12 and 100 μm, very particularly between 28 and 50 μm, especially 36 μm.

A particularly preferred carrier film is a double-sidedly etched polyethylene terephthalate film. One such film is available under the tradename Kemafoil HPH from Coveme.

For the production of the film it may be appropriate to add additives and other components which improve the film-forming properties, which reduce the tendency for crystalline segments to form, and/or which deliberately improve or else, where appropriate, impair the mechanical properties.

The film may be colored and/or transparent.

An adhesive cement layer is provided on one side of the carrier film, preferably covering it completely. All known adhesive cement systems may be used.

Besides natural or synthetic rubber-based adhesives, particularly silicone and polyacrylate adhesive cements are usable, preferably a low-molecular acrylate hot melt adhesive cement. The latter substances are described in greater detail in DE 198 07 752 A1 (U.S. Pat. No. 6,432,529) and DE 100 11 788 A1 (U.S. Pat. No. 6,541,707) Acrylate-based, UV-crosslinking adhesive cements are also suitable.

The coating weight is preferably in the range between 15 and 200 g/m², more preferably between 30 and 120 g/m², particularly preferably 50 g/m² (roughly corresponding to a thickness of 15 to 200 μm, more preferably 30 to 120 μm, particularly preferably 50 μm).

The adhesive cement is preferably a pressure-sensitive adhesive cement, that is to say a viscoelastic compound which is permanently tacky and remains capable of adhesion at room temperature in dry state. Adhesion takes place immediately and on almost all substrates with light pressure.

Pressure-sensitive adhesives based on polymer blocks containing polymer blocks are used. These are preferably produced from vinyl aromatics (A-blocks) such as styrene and those manufactured by polymerization of 1,3-dienes (B-blocks) such as butadiene and isoprene or a copolymer of the two. Mixtures of different block copolymers may also be used. Products that are partly or fully hydrogenated are preferred.

The block copolymers may have a linear A-B-A-structure. It is likewise possible to use block copolymers in radial form and star-shaped and linear multiblock copolymers.

Polymer blocks based on other aromatic-containing homo- and copolymers (preferably $C_8$- to $C_{12}$ aromatics) with glass transition temperatures>approx. 75° C., such as aromatic blocks containing α-methylstyrene, may also be used instead of the polystyrene blocks. Polymer blocks based on (meth)acrylate homopolymers and (meth)acrylate copolymers with glass transition temperatures>+75° C. are also usable. In this context, usable block copolymers include either those which use hard blocks based solely on (meth) acrylate polymers or those which use both polyaromatic blocks, polystyrene blocks for example, and poly(meth) acrylate blocks.

Unless stated otherwise in individual cases, the glass transition temperature characteristics for non-inorganic materials and materials that are not predominantly inorganic, particularly for organic and polymeric materials, refer to the glass transition temperature value Tg according to DIN 53765:1994-03 (see section 2.2.1).

According to the invention, block copolymers that use further polydiene-containing elastomer blocks and the hydrogenated products of such block copolymers, e.g. copolymers of a plurality of different 1,3-dienes, may also be used instead of styrene-butadiene block copolymers and styrene-isoprene block copolymers and/or the hydrogenated products thereof, and thus also styrene-ethylene/butylene block copolymers and styrene-ethylene/propylene block copolymers. Functionalized block copolymers such as maleic anhydride-modified or silane-modified styrene block copolymers are also usable according to the invention.

Typical application concentrations for the block copolymer are in a range between 30 wt % and 70 wt %, particularly in a range between 35 wt % and 55 wt %.

Other polymers which may be present and may replace up to half of the vinyl aromatic-containing block copolymers include polymers based on pure hydrocarbons, for example unsaturated polydienes such as natural or synthetic polyisoprene or polybutadiene, chemically essentially saturated elastomers such as saturated ethylene-propylene copolymers, α-olefin copolymers, polyisobutylene, butyl rubber, ethylene-propylene rubber and chemically functionalized hydrocarbons such as polyolefins that contain halogen, acrylate or vinyl ether.

Adhesive resins serve as tackifiers.

Suitable adhesive resins include preferably partially or completely hydrogenated resins based on rosin or rosin derivatives among others. At least partially hydrogenated hydrocarbon resins, for example hydrogenated hydrocarbon resins obtained by partial or complete hydrogenation of aromatic-containing hydrocarbon resins (for example Arkon P and Arkon M range manufactured by Arakawa or Regalite range by Eastman), hydrocarbon resins based on hydrogenated dicyclopentadiene polymers (for example Escorez 5300 range by Exxon), hydrocarbon resins based on hydrogenated C5/C9 resins (Escorez 5600 range by Exxon) or hydrocarbon resins based on hydrogenated C5 resins (Eastotac manufactured by Eastman) and/or mixtures thereof may also be used.

Polyterpene-based hydrogenated polyterpene resins are also usable. The aforementioned tackifying resins can be used either alone or in a mixture.

Light stabilizers such as UV absorbers, sterically hindered amines, antiozonants, metal deactivators, processing agents and terminal block reinforcing resins may typically be used as further additives.

Liquid resins, process oils or low-molecular liquid polymers, for example low-molecular polyisobutylenes with molecular weights<1500 g/mol (number average) or liquid EPDM types are typically used as plasticizers, for example.

The adhesive cement may be applied in the lengthwise direction of the adhesive tape in the form of a strip which is less wide than the adhesive tape carrier.

The coated strip may be 10 to 80% as wide as the carrier material. In such a case, the use of strips with a coating that is 20 to 50% as wide as the carrier material is particularly preferred.

Depending on the intended use, the carrier material may be coated with several parallel strips of the adhesive.

The position of the strip on the carrier is freely selectable, although it is preferably deposited directly on one of the edges of the carrier.

The adhesive cements may be produced and processed from a solution, a dispersion or from a melt. Preferred production and processing methods are conducted from a solution and a melt. The adhesive cement is produced particularly preferably from a melt, wherein in particular batch methods or continuous methods may be used. Continuous production of the pressure-sensitive adhesives with the aid of an extruder is particularly advantageous.

Processing from a melt may involve application methods via a nozzle or a calender.

Known methods based on a solution include coatings with doctor blades, knives or nozzles to name but a few.

Finally, the adhesive tape may include a covering material, by which the one adhesive cement layer is covered until it is ready for use. All of the materials listed in detail above are suitable for use as covering materials.

However, a lint-free material is preferably used, for example a plastic film or a thoroughly glue-laminated, long-fibre paper.

A preferred variant of the adhesive tape is that in which a liner is present.

A liner (release paper, release film) is not a constituent of an adhesive tape or label, but only an aid to the production or storage thereof or an aid for further processing by di-cutting. Furthermore, in contrast to an adhesive tape carrier, a liner is not firmly joined to a layer of adhesive.

The problem with known adhesive tapes is the fact that ideally the separating agent layer should reduce the separating forces between the adhesive cement layer and the carrier film, so that the adhesive tape can be wound onto itself for storage, and enable the adhesive to be unrolled again later. The unrolled adhesive tape still has a separating agent layer, so that when the adhesive tape is later wound around the medium with variable transverse dimension again, the separating forces between the adhesive cement layer and the carrier film below below it are weakened, this time disadvantageously, and the strength of the winding is reduced.

Surprisingly, however, it has been found that the separating forces can be increased to an unexpectedly high degree by using an etched film.

The object is further solved with an applicator according to the invention.

The applicator according to the invention comprises an adhesive tape roll and a device for unwinding an adhesive tape from the adhesive tape roll, wherein the adhesive tape unwound from the adhesive tape roll is furnished on one side of a carrier film with an adhesive cement layer.

The applicator is advantageously equipped with a cutting device for the adhesive tape. With the cutting device, the unwound and bonded adhesive tape can be cut.

The applicator may also include a pinch roller for pressing the adhesive tape against the substrate.

Collecting devices may also be provided for any liners present.

In a preferred embodiment of the invention, the adhesive tape includes at least one filament which extends in the lengthwise direction of the adhesive tape and thereby increases its tensile strength. In particular, such filaments may be glass filaments or PET filaments. The filaments may be integrated in the carrier film and/or in the adhesive cement layer. The filaments typically consist of a bundle of single filaments, wherein the bundle is formed by single filaments stuck together by sizing—i.e. with a bonding agent.

The filaments may be arranged lengthwise beside and at a distance from each other, or they may also be integrated in the carrier film or the adhesive cement layer or both as a scrim or woven.

The filament scrim or woven has a longitudinal tensile strength of preferably at least 100 N/cm, more preferably 200 N/cm, particularly preferably 500 N/cm.

The yarns for creating the scrim or woven preferably have a strength from 80 to 2200 dtex, more preferably 280 to 1100 dtex.

For the purposes of this invention, a filament is understood to be a bundle of straight, parallel single fibres/single filaments, which is also often referred to in the literature as a multifilament. Optionally, this fibre bundle may be stiffened by twisting it about itself, in which case the filaments are said to be spun or twined. Alternatively, the fibre bundle may be intrinsically stiffened by agitating with compressed air or a water jet. In the subsequent text, the general designation of filament will be used to refer to all of these embodiments.

The filament may be textured or smooth and may be spot-stiffened or not stiffened at all.

The scrim/woven may have been dyed subsequently or it may be made from spun dyed yarns.

The filaments consist more preferably of polyester, polypropylene, polyethylene or polyamide, most preferably polyester (Diolen).

The object of the invention is solved in the second aspect thereof with a device.

The term device is to be interpreted generally here. It comprises a medium whose size is variable transversely to the winding, for example transformers, packaging, steel bundles, batteries and high-voltage batteries. The media are preferably changeable in size transversely to the winding, preferably under the effects of temperature. An adhesive tape that is wound onto itself is provided around the medium transversely to the winding, which tape encircles the medium, lying flush against it, and is bonded thereto.

The device includes an adhesive tape which is wound onto itself with a carrier film, on one side of which an adhesive cement layer is applied. The adhesive tape is provided in particular for winding around media which are capable of expanding transversely to the winding, such as high-voltage batteries, for example. The device is manufactured in particular for the purposes of the adhesive tape and preferably by one of the aforementioned methods.

The invention will be described with reference to an exemplary embodiment in a drawing.

The invention relates to a method for winding multiple times around media that expand transversely to the winding. An example of such a use is the manufacture of high-voltage batteries, in which the adhesive tape is bonded to itself in multiple plies. A force is exerted on the wound adhesive tape by the preloading created during the act of winding itself, but also by expansion processes while the batteries are charging and discharging. In order to be able to sustain in an extreme manner the tensile forces acting on the adhesive tape during the expansion of the battery, the adhesive tape may be reinforced with one or more filaments extending lengthwise.

The adhesive tape according to the invention includes an etched carrier film 1 and an adhesive cement layer 2 on one side of carrier film 1.

Figure 1:
FIG. 1 shows a schematic representation of a static shear test.
Figure 2:
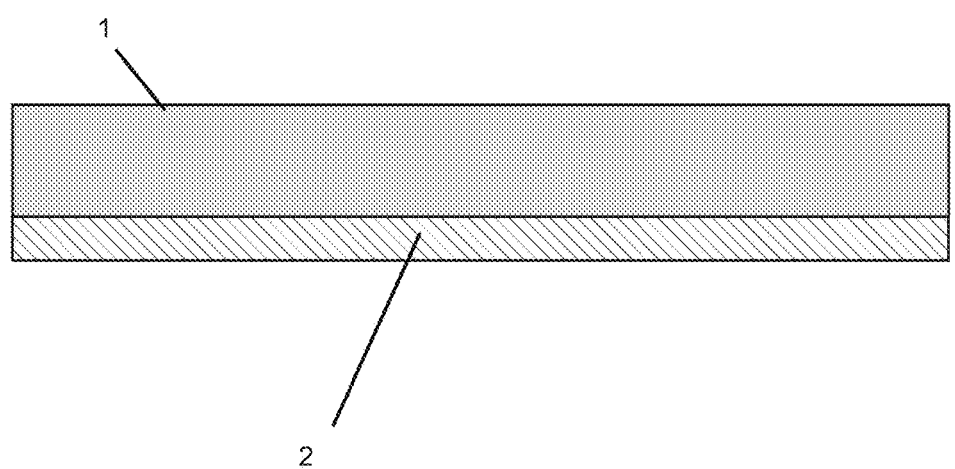
FIG. 2 shows an exemplary structure of an adhesive tape according to the invention.

One possible way to test the bonding strength of the adhesive cement that has been applied to one side of the carrier film on the other side is to determine the shear strength of the adhesion on the other side. The method used to determine shear strength is a dynamic shear test as represented in FIG. 1. The test is carried out as follows. A strip of adhesive tape measuring 40×25 mm is stuck to the reverse side of a strip of adhesive tape measuring 40×25 mm over an area of 25×25 mm; the adhesion area is pressed with 100 N/cm$^2$ for one minute. The adhesive tape assemblage is attached to a tensile test machine by the protruding strip of adhesive tape; the sample is pulled apart at a speed of 50 mm per minute and the force relative to the adhesion area (N/cm²) at which the strip of adhesive tape has been sheared off is measured. The tensile forces are indicated by arrows.

For the sake of simplicity, the adhesive cement on the upper strip of adhesive tape is not shown at all. Moreover, the adhesive cement is only shown in the adhesion area on the second strip.

Figure 3:
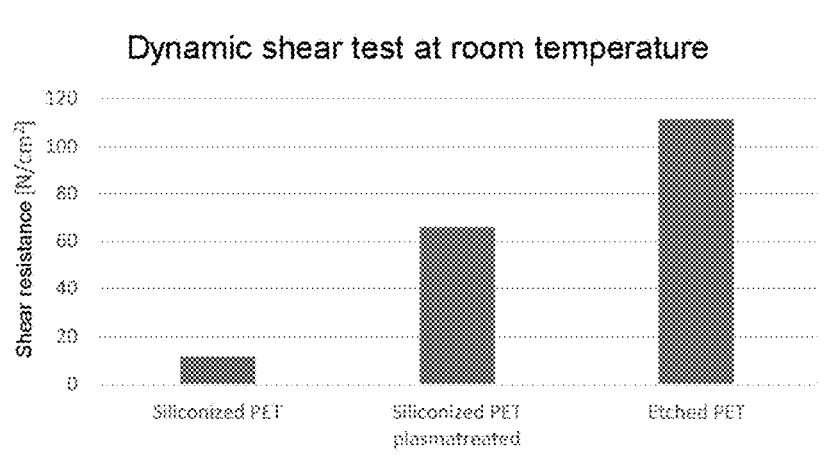
FIG. 3 illustrates the shear resistance increase with the use of an etched film as carrier.

The carrier film 1 in the Comparative Examples 1 and 2 is a siliconized PET film, and in Example 3 an etched PET film. An acrylate adhesive cement is used as a pressure-sensitive adhesive. The following graph shows that the shear resistance with respect to the coating of the adhesive tape reverse side with silicone is increased by a plasma treatment. To this end, a physical surface treatment in the form of a plasma treatment immediately before the adhesive tape is applied has the effect of optimizing the adhesion of the reverse side of the carrier film which is furnished with a separating agent. With the use of an etched film as carrier, a marked and unexpectedly high increase, in this case virtually a doubling of the shear resistance, can again be seen (see FIG. 3).

Compared with the known standard adhesive tapes which have not undergone plasma treatment of the reverse side, the following advantages may be mentioned:
Reliable attachment in the case of multilayer bonding. Inter alia, this can prevent the last layer of the bonding arrangement from positioning itself.
Process steps such as a plasma treatment for improving the bondability of the reverse side are unnecessary.

LIST OF REFERENCE SIGNS

1 Carrier film
2 Adhesive cement layer

The invention claimed is:

1. A method for bonding by wrapping a medium which expands transversely to a winding with an adhesive tape, the method comprising:
unrolling the adhesive tape from an adhesive tape roll, wherein the unrolled adhesive tape comprises a carrier film with a first side having an adhesive cement layer provided thereon and an opposite second side having a separating agent layer provided at least partially thereon, wherein an area of the second side of the carrier film covered by the separating agent layer is no more than 50% of a total area of the second side of the carrier film, wherein at least a surface of the second side of the carrier film has been etched; and
winding the adhesive tape around the medium that expands transversely to the winding, so that at least a portion of the adhesive tape is bonded to the adhesive cement layer on a lower winding ply.

2. The method according to claim 1, wherein the second side of the carrier film is not furnished with another or additional layer.

3. The method according to claim 1, wherein the adhesive tape is wound around the medium in several winding plies which are bonded one on top of the other.

4. The method according to claim 1, wherein trichloroacetic acid ($Cl_3C$—COOH) or trichloroacetic acid in combination with inert crystalline compounds were utilized to etch at least the second side of the carrier film.

5. The method according to claim 1, wherein an adhesive cement of the adhesive cement layer is selected from the group consisting of adhesive cements based on natural or synthetic rubber.

6. A device comprising:
a medium whose size is variable transversely to a winding; and
an adhesive tape that is wound onto itself around the medium transversely to the winding with a carrier film of the adhesive tape, wherein an adhesive cement layer is applied to a first side of the carrier film and a plasma-treated separating agent layer is applied to an opposite second side of the carrier film such that an area of the second side of the carrier film covered by the separating agent layer is no more than 50% of a total area of the second side of the carrier film.

7. The device according to claim 6, wherein the adhesive tape is bonded in several winding plies one on top of the other.

8. The device according to claim 6, wherein the adhesive tape includes at least one filament which increases the tensile strength thereof.

9. The device according to claim 6, wherein a plurality of filaments is provided in the adhesive tape.

10. The device according to claim 6, wherein a separating agent in the separating agent layer originates from the group consisting of surfactant release systems based on long-chain alkyl groups such as stearyl sulfosuccinates or stearyl sulfosuccinamates; polymers selected from the group consisting of polyvinylstearyl carbamates, polyethylene imine stearyl carbamides, chromium complexes of C14-C28 fatty acids and stearyl copolymers or based on acrylic polymers with perfluorinated alkyl groups; silicones or fluorosilicone compounds.

11. The device according to claim 6, wherein an adhesive cement in the adhesive cement layer originates from the group consisting of adhesive cements based on natural or synthetic rubber.

12. An applicator comprising:
adhesive tape roll and a device for unwinding an adhesive tape from the adhesive tape roll, wherein the adhesive tape unwound from the adhesive tape roll comprises a carrier film having a first side with an adhesive cement layer provided thereon and an opposite second side with a separating agent layer provided thereon, wherein the second side has been etched and has an area covered by the separating agent layer of no more than 50% of a total area of the second side of the carrier film; and
a plasma nozzle directed at the separating agent layer of the unwound adhesive tape.

13. The applicator according to claim 12, further comprising a cutting device for the adhesive tape.

14. The applicator according to claim 12, further comprising a suction device for reaction byproducts created during a plasma treatment.

* * * * *